United States Patent [19]

Thorsoe

[11] 3,732,403

[45] May 8, 1973

[54] REVERSIBLE COUNTER

[75] Inventor: Flemming Thorsoe, Augustenborg, Denmark

[73] Assignee: Danfoss A/S, Nordborg, Denmark

[22] Filed: Nov. 8, 1971

[21] Appl. No.: 196,594

[52] U.S. Cl. ................235/92 PE, 328/44, 235/92 R, 235/92 PL, 235/92 EV

[51] Int. Cl. ..............................................H03k 21/30

[58] Field of Search ......................235/92 EA, 92 PE, 235/92 CT, 92 EV, 92 IG, 92 PL; 328/44; 307/222

[56] References Cited

UNITED STATES PATENTS

| | | | |
|---|---|---|---|
| 3,496,562 | 2/1970 | Smith | 235/92 PL |
| 3,426,296 | 2/1969 | Christiansen et al. | 235/92 PL |
| 3,017,093 | 1/1962 | Rowley | 235/92 PE |

*Primary Examiner*—Maynard R. Wilbur
*Assistant Examiner*—Joseph M. Thesz, Jr.
*Attorney*—Wayne B. Easton

[57] ABSTRACT

The invention relates to a reversible counter to which count-up and count-down impulses can be fed. Blocking means is provided in which the exceeding of the upper and lower limits of the counter is prevented. The blocking means is incorporated in a NAND element associated with the impulse input. The blocking means is influenced by the outputs of the binary stages of the counter being monitored and by the counting direction signal.

8 Claims, 1 Drawing Figure

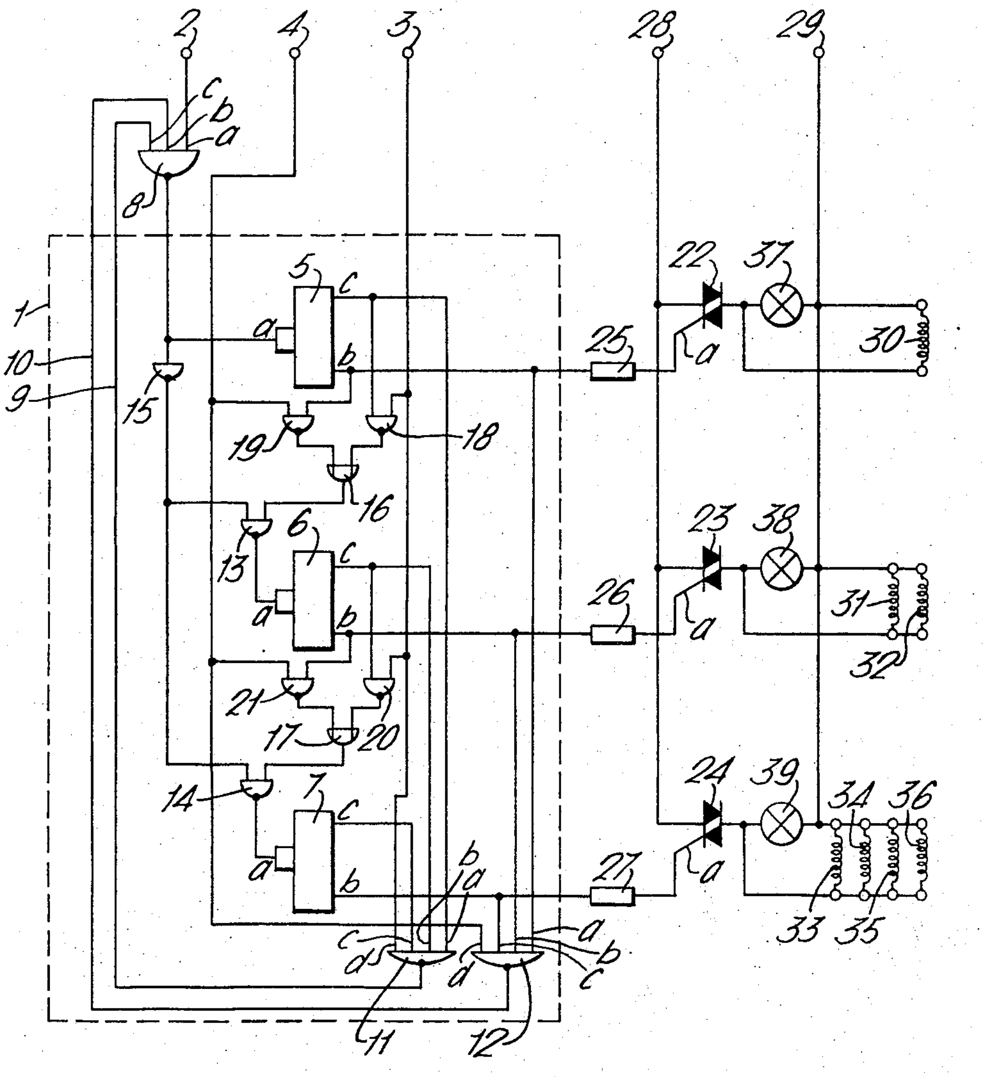
2
4
3
28
29
1
5
6
7
8
9
10
11
12
13
14
15
16
17
18
19
20
21
22
23
24
25
26
27
30
31
32
33
34
35
36
37
38
39

REVERSIBLE COUNTER

The invention relates to a reversible counter to which count-up and count-down impulses can be fed.

Counters of this kind normally have one impulse input and two counting direction inputs, one of which receives a signal during counting up and the other a signal during counting down. Instead of this, the impulse counter can have two impulse inputs, one of which receives count-up impulses and the other count-down impulses.

Known counters of this kind are so constructed that they operate cyclically, i.e., that upon reaching the upper counting limit and upon the supply of a further count-up impulse, they switch back to their lower counting limits, and upon further count-up impulses being supplied, they pass through their counting range several times. The same applies as regards the lower counting limits when further count-down impulses are supplied. If this characteristic is not required, it was necessary to use a counter having a greater content, in which there did not arise the danger of the counting limits being exceeded during counting up or counting down. Large counters of this kind are however correspondingly complicated and expensive.

The object of the invention is to provide a reversible counter, in which exceeding of the limits of the counter during counting up and counting down is prevented in a simple manner.

According to the invention, this object is achieved by a blocking device which is associated with the impulse input and which prevents the supply of count-up impulses when the upper counting limit is reached and the supply of count-down impulses when the lower counting limit is reached.

Thus, no further impulses that would cause the counter to exceed its working range are supplied to it in its end positions. In particular, the entire content of the counter is not annulled when the upper limit is exceeded, nor is it completed when the lower limits of the counters is not reached. Thus, even in small, inexpensive counters, exceeding of the counting limits is safely prevented.

In practice, a reversible counter of this kind generally consists of binary stages. In this connection it is expedient for the blocking device to be influenced on the one hand by the outputs of all the stages and on the other by the counting direction signal. By monitoring the outputs of all the stages it is possible to fix the upper or lower end-value of the counter. Since the counting direction signal is also available at one of the inputs, the blocking means can be actuated in a simple manner.

In particular, there can be connected on the output side of the counter and AND element to which is fed, in addition to the counting impulses, the outputs of two further AND elements which have $n$ inputs, associated with each binary stage, and a further input which, in the case of one AND element, receives a signal during counting up and, in the case of the other AND element receives a signal during counting down. The AND element on the input side of the counter then acts as a blocking means, which only lets the impulses through if all the other conditions dependent on the two other AND elements are also fulfilled. This is no longer the case if the counter is in one of its end positions.

The count-up AND element is expediently connected to the one set of outputs of the binary stage and the count-down AND element to the other outputs of the binary stages, both however executing an inversion. This results in very simple circuit junctions.

It is particularly advantageous if a system having one working range is controlled in dependence upon the numerical content of the counter, the limits of this range corresponding to the limiting values of the counter. In this arrangement, a prescribed portion of the working range can be associated with each numerical value of the counter. This novel use of the counter as a control means ensures that the work range of the controlled system is not exceeded. Thus, no difficulties arise if the terminal points of the working range of the controlled system are not adjacent, as is generally the case.

In particular, the controlled system can have a number of part capacities, which can be switched in and off and the number of which in operation at any particular time corresponds to the numerical content of the counter. Particularly with a capacity control of this kind, it is absolutely necessary to prevent the capacity from suddenly returning to zero when the uppermost limit is not reached, or from suddenly switching over to the top value when the lower limit is not reached.

Expediently, the part capacities are constituted by $n$ groups each of $2^{n-1}$, and the output signals of the $n$ binary stages each control the associated $n^{th}$ group. In this way, not only is a clear association of the counter outputs with the number of switched-in part capacities obtained without any special decoding means being used, but in addition uniform starting of all the sets for each part capacity is ensured.

If the output signals of the counter are voltages, they can directly control a power switch, in particular an electronic power switch. An electronic power switch that may be considered is, for example, a controlled rectifier such as is obtainable under the trade name TRIAC.

The invention will now be described in more detail by reference to an embodiment illustrated in the drawing.

A counter 1 has an impulse input 2, receiving positive counting impulses, an upwards counting direction input 3, to which a positive voltage is applied for counting up, and a downwards counting direction input 4, to which a positive voltage is applied for counting down. The three inputs 2–4 are supplied with input signals in dependence upon a regulating device, a time plan or the like.

The counter 1 has three binary counter stages 5, 6 and 7, each of which consists of a bistable multi-vibrator having one input *a* and two outputs *b* and *c*, which, upon the occurrence of a negative impulse at the input *a* alternately supply a position or negative voltage. The impulse input 2 is connected to an input *a* of a NAND element 8 (AND-NOT element). Two further inputs *b* and *c* are connected to the outputs of two NAND elements 11 and 12. Three inputs *a*, *b* and *c* of the element 11 are connected to the output *c* of the binary stage 5, 6, 7, which connects three corresponding inputs of the element 12 with the outputs *b* of the binary stages. Each fourth input *d* is connected to the upward counting direction input 3 and the downward counting direction input 4. The input 5*a* is immediately adjacent the output of the NAND element 8. The inputs 6*a* and 7*a*, on the other hand, are located at the output of NAND elements 13 and 14, which, on the one hand, are acted upon by the NAND element 8 through a NOT element 15 with input impulses and, on the other hand, through an OR element 16 and 17 with negatizing inputs according to the condition of the preceding counter stage. For this purpose, two NAND elements 18 and 19 are provided on the output side of the OR element 16. The inputs of the element 18 are located at the output 5*c* and at the counting direction input 3, and the inputs of the element 13 are located at the output 5*b* and at the counting direction input 4. In a similar manner, two NAND elements 20 and 21 are provided on the output side of the OR element 17. The inputs of the element 20 are located at the output 6*c* and at the counting direction input 3, and the inputs of the element 21 are located at the output 6*b* and at the counting direction input 4. By means of the output *b* on the binary stages 5, 6 and 7 the counter 1 controls three controlled semi-conductor valves 22, 23 and 24, the control electrodes *a* of which are connected directly to the output *b* of the stages 5 – 7, through protective resistors 25, 26 and 27. Alternating-current voltage is applied between the terminals 28 and 29. However, the terminal 28 is held at the same positive value at which the terminals 2 – 4 receive their signal voltages.

When the valve 22 is conducting, a winding 30 is energized. When the valve 23 is conducting, two windings 31 and 32 are energized. When the valve 24 is conducting, four windings 33, 34, 35 and 36 are energized. The winding in question may be that of a magnetic valve, an electromagnetic switching relay or a motor. In particular, a part capacity if controlled with the help of these windings. For example, a refrigerating unit having seven refrigerant compressors can be controlled. For monitoring, indicator lamps 37, 38 and 39 are connected in parallel with the windings.

If it is assumed that all the counter stages 5 – 7 are at zero, i.e., pass a negative voltage at the output *c* and a positive voltage at the output b, then all the valves 22 – 24 are blocked and none of the windings 30 – 36 is switched in. If a certain capacity if now required, then a positive voltage is applied to the upward input 3, whilst positive impulses are supplied to the impulse input 2. The counter stage 5 is switched to 1 by the first impulse, the output *c* becoming positive and the output *b* negative. The negative voltage at the output 22*a* renders the valve 22 conducting and the winding 30 of the associated capacity is switched in. If this capacity is not sufficient, a further counting impulse is supplied to the terminal 2 after some time. This switches the counter stage 5 to zero, the output *c* again becoming negative and the output *b* positive. Since a positive voltage is present at the input 3 and the output *c* was positive, a negative signal is simultaneously released at the output of the NAND element 18, which signal, after negation in the OR element 16, provides an output of the NAND element 13 with a positive signal, whilst the other inputs directly receives a positive impulse through the NOT element 15. In this way the counter stage 6 is switched to one, the output *c* becoming positive and the output *b* negative. The valve 23 becomes conducting and the capacity associated with the windings 31 and 32 is switched in, whilst the capacity associated with the winding 30 will have been switched off again. In this way, seven part capacities can be switched in in succession.

These part capacities are switched off again in a similar manner when the counting impulses are supplied at the input 2, whilst at the same time a positive voltage is applied at the downward counting direction input 4. Under these conditions, the NAND element 13 lets through an impulse from the NOT element 15 each time, when the NAND element 19 receives a positive signal from the output 5*b* and accordingly releases a negative output signal, which leaves the OR element 15 as a positive signal. The same applies as regards the switching on and off of the counter stage 7.

The NAND element 8 acts as a blocking means, which lets no further impulses pass to the counter 1 if the latter has reached its end position. If it is assumed that the counter has reached its upper end position at which all the outputs *c* of the counter stages are positive and that a further upwards impulse is supplied, then a positive voltage is applied at all the inputs of the NAND element 11, at the inputs *a*, *b* and *c*, since they are connected to the outputs *c* on the counter stages, and at the input *b*, since this is connected to the upwards counting direction input 3. Consequently, a negative signal is sent to the input *b* of the NAND element 8, and the element 8 is no longer able to pass any impulses through. In a similar manner, the NAND element 12 becomes effective when the lower end position of the counter is reached and a further downward impulse is to be sent.

The blocking means can also be constituted by a transistor, a thyratron or the like, to which is applied a blocking voltage for as long as no impulse is to be let through. If a decoding circuit is connected on the output side of the reversible counter, the blocking signal for the blocking means can also be derived from the decoding circuit.

I claim:

1. A reversible counter comprising n counter stages where $n$ is an integer greater than one and each of said stages has an input and two outputs; input control means having a first input to which pulses to be counted are supplied, second and third inputs, and an output which is connected to said counter stages; an upward-count input to which an upward-count signal is supplied when said pulses are to be counted upwards, said upward-count signal being supplied to control the last $n-1$ counter stages; a downward-count input to which a downward-count signal is supplied when said pulses are to be counted downwards, said downward-count signal being supplied to control the last $n-1$ counter stages; a minimum-count detector unit having $n+1$ inputs connected respectively to corresponding outputs of said counter stage and to said downward-count input, and an output connected to said second input of said input control means, a stop signal being supplied to said input control means by said minimum-count detector unit when simultaneously the counter is storing the minimum-count and a signal is being supplied to said downward-count input; a maximum-count detector unit having $n+1$ inputs connected respectively to the other corresponding outputs of said counter stages and to said upward-count input, and an output connected to said third input of said input control means, a stop signal being supplied to said input control means by said maximum-count detector means when simultaneously the counter is storing the maximum count and a signal is being supplied to said upward-count input; each pulse supplied to said first input of said input control means being passed through the output of said input control means to said counter stages to cause a change of one in the count stored by the counter, except during times when a stop signal is being supplied by either of said detector units to said input control means, the supply of said stop signal preventing the passage of said pulses to the output of said input control means so that said count stored by the counter remains at one of said minimum and maximum-counts during said times.

2. A counter according to claim 1 wherein said input control means comprises a NAND element.

3. A counter according to claim 2 wherein each said detector unit comprises a NAND element.

4. A counter according to claim 1 forming part of a counter controlled system having a single working range, said range having limits corresponding to said minimum and maximum counts of the counter.

5. A counter according to claim 4 wherein said system includes a plurality of parts which can be individually switched on and off singly and in combination, the number of said parts switched on at any time corresponding to said count stored by the counter.

6. A counter according to claim 5 wherein said parts are comprised of *n* groups each of $2^{n-1}$ parts, output signals derived from said counter stages operating to switch at least one group each time a pulse is passed by said input control means to the counter stages.

7. A counter according to claim 6 wherein said output signals of the said counter stages are voltages, and electronic power switches are controlled by said voltages to effect said switching.

8. A counter according to claim 7 wherein said power switches are semiconductor switches.

* * * * *